(12) United States Patent
Umemoto et al.

(10) Patent No.: US 8,643,240 B2
(45) Date of Patent: Feb. 4, 2014

(54) SUPERCONDUCTING ROTATING ELECTRICAL MACHINE AND STATOR FOR USE WITH SUPERCONDUCTING ROTATING ELECTRICAL MACHINE

(75) Inventors: Katsuya Umemoto, Akashi (JP); Kiyoshi Aizawa, Kobe (JP); Minoru Yokoyama, Abiko (JP); Yousuke Kimura, Kobe (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 147 days.

(21) Appl. No.: 13/394,460

(22) PCT Filed: Sep. 10, 2010

(86) PCT No.: PCT/JP2010/065662
§ 371 (c)(1),
(2), (4) Date: Mar. 6, 2012

(87) PCT Pub. No.: WO2011/030874
PCT Pub. Date: Mar. 17, 2011

(65) Prior Publication Data
US 2012/0161568 A1  Jun. 28, 2012

(30) Foreign Application Priority Data

Sep. 11, 2009 (JP) ................................. 2009-210449

(51) Int. Cl.
*H02K 1/00* (2006.01)
(52) U.S. Cl.
USPC ............................ 310/198; 310/184; 310/201
(58) Field of Classification Search
USPC ............ 310/179–184, 198, 201, 206–208, 52
See application file for complete search history.

(56) References Cited

U.S. PATENT DOCUMENTS

| | | | | |
|---|---|---|---|---|
| 4,037,124 A | * | 7/1977 | Kullmann et al. | 310/52 |
| 4,095,333 A | * | 6/1978 | Kuter et al. | 29/598 |
| 4,151,639 A | * | 5/1979 | Weghaupt | 29/598 |

(Continued)

FOREIGN PATENT DOCUMENTS

| | | |
|---|---|---|
| CN | 101399470 A | 4/2009 |
| JP | A-02-219460 | 9/1990 |

(Continued)

OTHER PUBLICATIONS

Office Action issued in Chinese Patent Application No. 201080040317.8 dated Jul. 2, 2013 (with translation).

(Continued)

*Primary Examiner* — Thanh Lam
(74) *Attorney, Agent, or Firm* — Oliff & Berridge, PLC

(57) ABSTRACT

A superconducting rotating electrical machine has a rotor with superconducting windings and a stator disposed around the rotor. The stator has a number of teeth disposed at a regular interval about a rotational axis of the rotor to define slots each between adjacent teeth and a plurality of windings, each winding having a strip-like wire member, the wire member having a plurality of rectangular cross-section wires in which said rectangular wires are arranged in parallel to each other and electrically insulated away from each other, the winding being constructed by winding the strip-like wire member a plurality of times to have first and second winding portions having a cross section in which the rectangular wires are positioned in matrix.

12 Claims, 15 Drawing Sheets

(56) References Cited

U.S. PATENT DOCUMENTS

| | | | |
|---|---|---|---|
| 4,214,182 A * | 7/1980 | Keim | 310/216.015 |
| 4,251,745 A * | 2/1981 | Germann | 310/52 |
| 4,328,437 A * | 5/1982 | Inticbar et al. | 310/52 |
| 4,876,469 A * | 10/1989 | Khutoretsky et al. | 310/52 |
| 5,175,396 A * | 12/1992 | Emery et al. | 174/36 |
| 6,911,759 B2 | 6/2005 | Kalsi | |
| 2002/0089253 A1* | 7/2002 | Kudlacik | 310/260 |
| 2004/0212258 A1* | 10/2004 | Laskaris et al. | 310/54 |
| 2005/0248222 A1* | 11/2005 | Evangelos et al. | 310/54 |

FOREIGN PATENT DOCUMENTS

| | | |
|---|---|---|
| JP | A-04-285462 | 10/1992 |
| JP | A-2000-217282 | 8/2000 |
| JP | A-2003-047233 | 2/2003 |
| JP | A-2005-176578 | 6/2005 |
| JP | A-2006-325338 | 11/2006 |

OTHER PUBLICATIONS

Dec. 14, 2010 International Search Report issued in International Patent Application No. PCT/JP2010/065662 (with translation).

International Preliminary Report on Patentability issued in International Application No. PCT/JP2010/065662 on Apr. 11, 2012 (with translation).

* cited by examiner

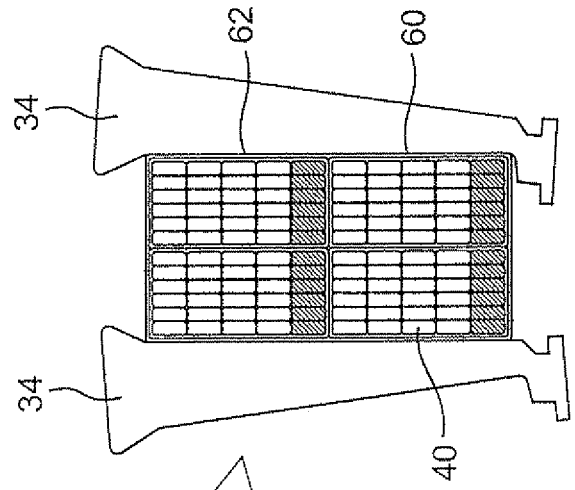
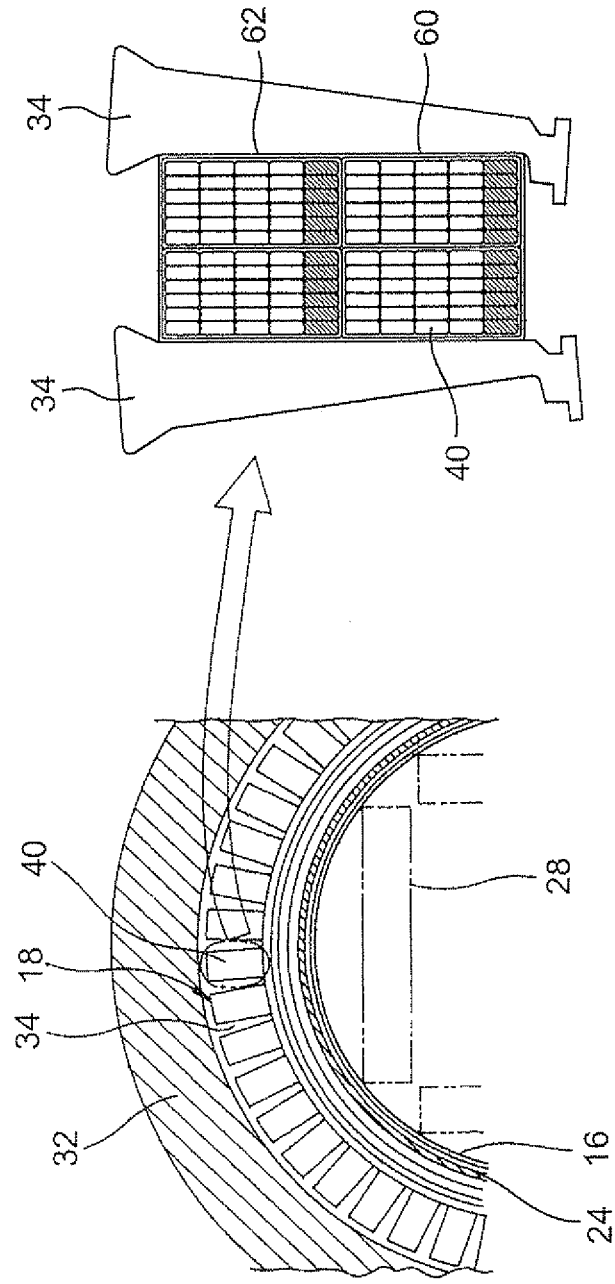

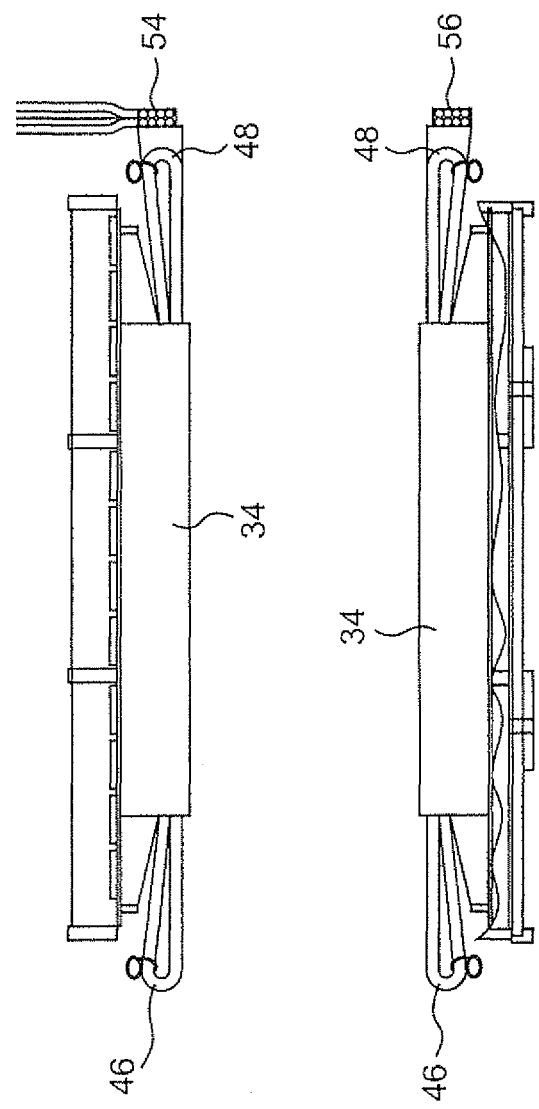

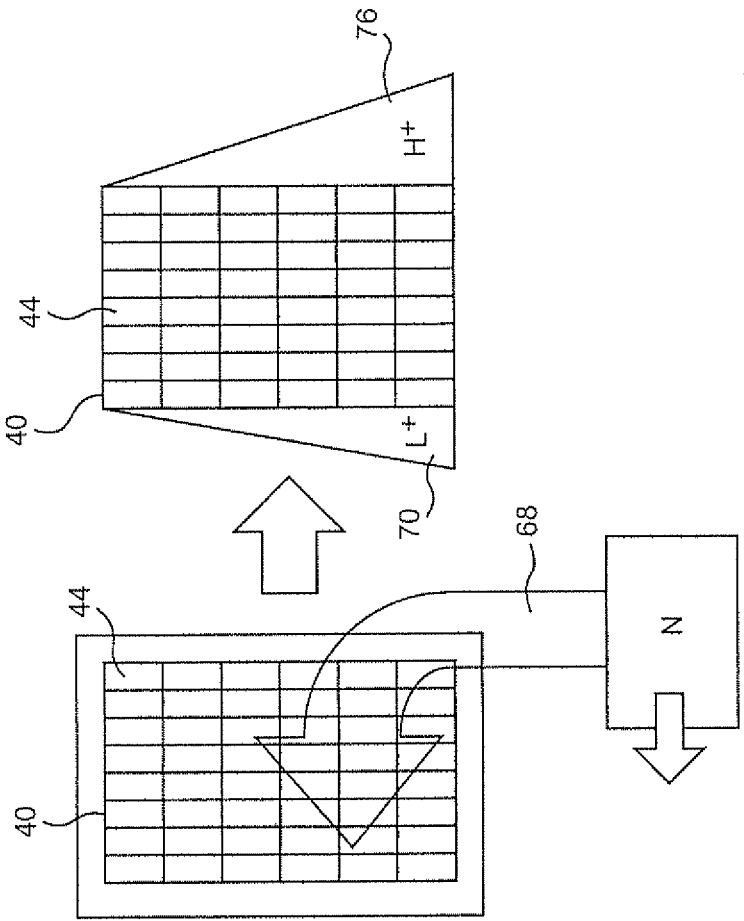

Fig.16A
Fig.16B
Fig.16C
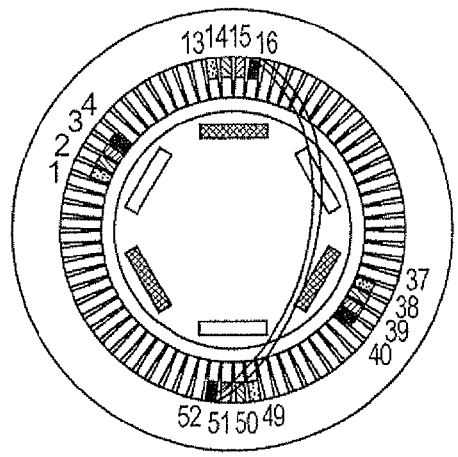
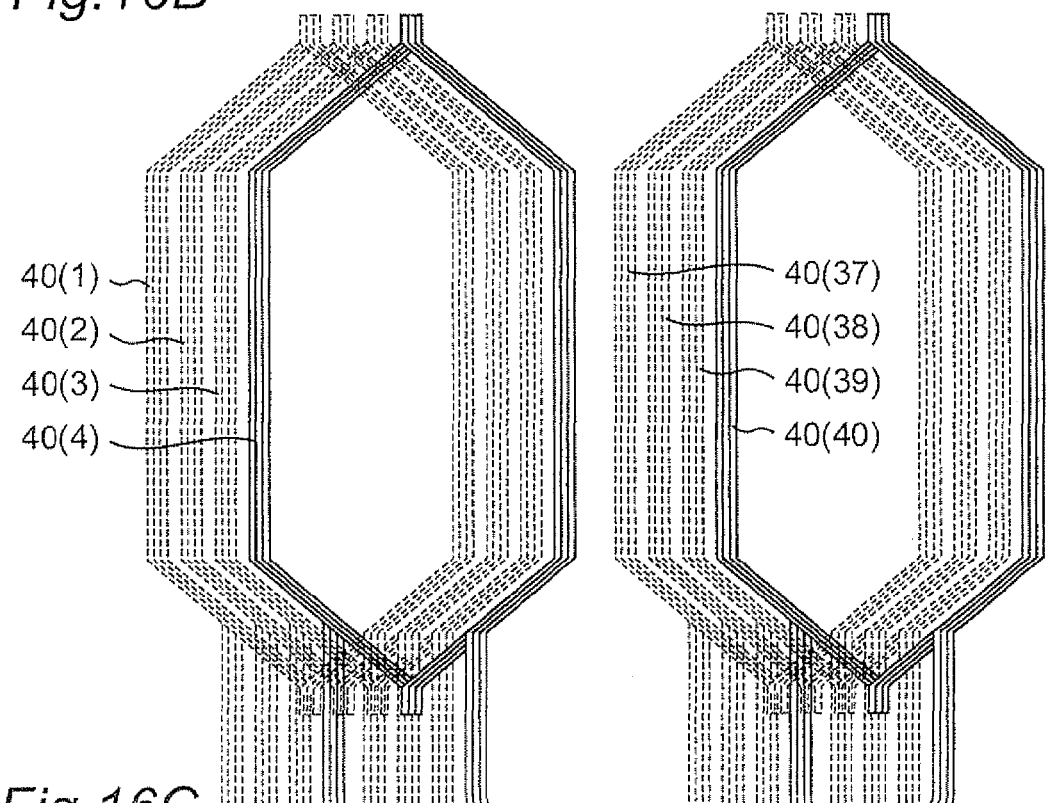
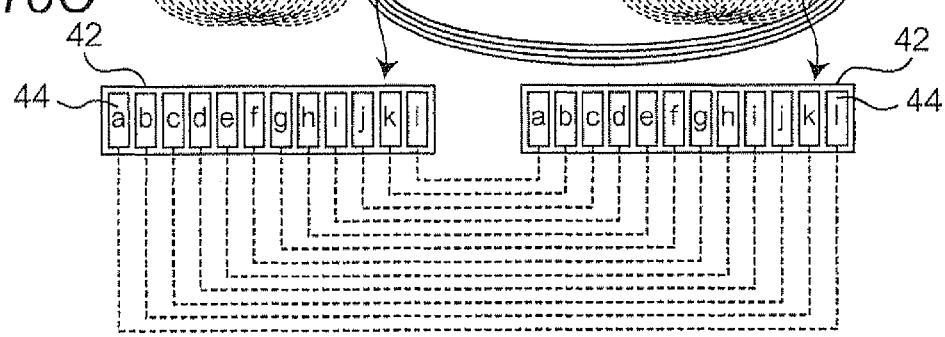

SUPERCONDUCTING ROTATING ELECTRICAL MACHINE AND STATOR FOR USE WITH SUPERCONDUCTING ROTATING ELECTRICAL MACHINE

FIELD OF THE INVENTION

The present invention relates to a superconducting rotating electrical machine and a stator for use with the rotating electrical machine. In particular, the present invention relates to a stator capable of increasing a power conversion efficiency of the rotating electrical machine.

BACKGROUND OF THE INVENTION

Conventionally, a variety of rotating electrical machines such as induction motor and permanent-magnetic synchronous motor have been proposed for use with power generators. Typically, each rotating electrical machine has windings and a core so that magnetic fluxes generated by an application of electric current to the windings are concentrated in the core to increase the intensity of magnetic field and a resultant rotational force of the rotating electrical machine.

For this purpose, the core is made of ferromagnetic material such as iron and has slots or grooves defined therein for accommodation of the windings. The core is made by stacking a plurality of thin plates each covered by a suitable electrically insulating material. In order to reduce eddy current caused by the change of magnetic flux generated by the windings or the permanent magnets, the plates are made from alloy steel such as magnetic steel sheet with reduced magnetic hysteresis and elevated saturation magnetization.

Preferably, the rotating electrical machine has elevated power conversion efficiency. To satisfy this requirement, copper loss and eddy current loss should be minimized. For example, the copper loss results in an electric resistance heating due to electric current which flows in the conductive members such as armature or stator windings. In particular, the copper loss occupies a large part of the total loss in the rotating devices such as small- or medium-size, brushless rotating devices or permanent magnet synchronous generators.

The eddy loss results in the electric resistance heating due to the eddy current generated around the magnetic flux, which is in proportion to the square of the driving frequency of the rotating device. Then, an increase of the driving frequency as well as the resultant rotating frequency causes a significant increase of the eddy current in the windings.

This means that, in order to decrease the copper loss, it is important to decrease the electric resistance in the armature or stator windings. In line with this, JP 2000-217282 A discloses to increase a ratio of the gross cross-sectional area of the windings relative to the cross-sectional area of the slots or grooves for receiving the windings and thereby decrease the copper loss to be generated in the stator.

Conventionally, it has been known to form a bundle of windings by bundling a plurality of circular or rectangular cross-section wires. Using the bundle of windings can decrease more eddy current loss than using large-diameter windings. The bundle of windings is made simply by bundling a number of parallel wires. JP 2006-325338 A discloses to a twisted winding made by twisting a number of wires.

Recently, a superconducting rotating electrical machine is proposed in JP 2005-176578 A, for example, in which superconducting property is provided to the rotor and the stator by forming the armature windings using the superconducting wires for the purpose of increasing the power conversion efficiency and the downsizing of the superconducting rotating electrical machine. JP 2005-176578 A also discloses a superconducting rotating electrical machine incorporating superconducting rotor and stator, in which the windings are made of superconducting material to introduce the superconducting property and thereby a compact rotating electric machine with an increased electric conversion efficiency can be obtained.

In the meantime, a size of the normal-conducting rotating electrical machine with a stator or rotor made of ferromagnetic material such as iron is substantially determined by a saturated magnetic field intensity, or a cross-sectional area of the ferromagnetic material or a number of windings required for obtaining a predetermined output. Also, as described above, the eddy current loss in the rotating electrical machine can be reduced by stacking thin plates made of material exhibiting smaller iron loss such as magnetic steel and covered by electrically insulating material.

Typically, a ratio of the gross cross-sectional area of the windings relative to the total cross-sectional area of the slot in the normal-conducting rotating electrical machine ranges from about 30% to about 40%, which is insufficient for effectively reducing a temperature increase due to the copper loss in the stator if a large amount of electric current is applied to the windings.

Also, although the bundle of windings with circular or rectangular cross-sectional wires may be used to ease the winding operations, the number of windings relevant to the eddy current loss is limited to about 20 to 30.

Further, using stator windings made of bismuth-based high temperature superconducting wires typically employed in the superconducting rotating electrical machine may affect the superconducting property such as an increase in temperature of the windings due to heat generated by the alternating-current loss and a resultant decrease in critical current. Then, providing a superconducting property for the stator may be technically difficult and, even if possible, result in a cost increase in the manufacturing of the superconducting rotating electrical machine. Also, forming the stator windings of the superconducting rotating electrical machine with bismuth-based high temperature superconducting material conventionally used in the superconducting rotating electrical machine results in the temperature increase in the windings due to alternating-current loss and thereby reduces the critical current associated with the superconducting property of the windings. In conclusion, it may be technically impossible to provide a superconducting property for the stator. Also, providing a superconducting property for the stator will result in a cost increase in the manufacturing of the superconducting rotating electrical machine.

In the meantime, a superconducting rotating electrical machine with a superconducting rotor and a normal-conductive stator can increase the intensity of magnetic field and, as a result, decrease the overall manufacturing cost of the superconducting rotating electrical machine, which reduces copper loss in the superconducting rotor and, as a result, increases the power conversion efficiency, but increases copper loss, iron loss, or eddy current loss in the normal-conductive stator. Also, the magnetic field of the iron core is easy to be saturated by the elevated magnetic field from the armature, which prohibits an application of alternating filed. This results in that the elevated efficiency derived from the superconducting rotor is cancelled by the losses in the stator, which fails to meet the requirements for the further increase of power conversion efficiency in the superconducting rotating electrical machine. To address this problem, the superconducting rotor and the normal-conductive stator may be combined with each other to increase the intensity of magnetic field and thereby prevent a significant increase of the manufacturing cost. This also increases the power conversion efficiency of the rotating electrical machine. As a tradeoff, however, the normal-conductive property in the stator causes copper loss, iron loss, and/or eddy current loss. Also, the magnetic field of the iron core will be instantly saturated by the magnetic filed of the armature, which weakens the alternating magnetic field. Therefore, the elevated efficiency derived from the superconducting—rotor will be cancelled by the losses in the stator.

Accordingly, the present invention is to solve those problems and an object of the invention is to increase the power conversion efficiency in the superconducting rotating electrical machine with the superconducting rotor and normal-conductive stator.

SUMMARY OF THE INVENTION

An aspect of the invention is a stator for use in a superconducting rotating electrical machine, the rotating electrical machine comprising a rotor with superconducting windings and said stator mounted around the rotor, and the stator comprises
a number of teeth disposed at a regular interval about a rotational axis of the rotor to define slots each between adjacent teeth; and
a plurality of windings, each winding having a strip-like wire member, said wire member having a plurality of rectangular cross-section wires in which said rectangular wires are arranged in parallel to each other and electrically insulated away from each other, said winding being constructed by winding said strip-like wire member a plurality of times to have first and second winding portions having a cross section in which said rectangular wires are positioned in matrix, said first and second winding portions having the same arrangement of said wires in a cross section perpendicular to said rotational axis, said first winding portion being disposed in an outward region of one of said slots and said second winding portion being disposed in an inward region of another of said slots corresponding to said one of said slots.

In another aspect of the invention is stator A stator for use in a superconducting rotating electrical machine, the rotating electrical machine comprising a rotor with superconducting windings and said stator mounted around the rotor, comprising:
a number of teeth disposed at a regular interval about a rotational axis of the rotor to define slots each between adjacent teeth; and
a plurality of windings, each winding having a strip-like wire member, said wire member having a plurality of wires in which said wires are arranged in parallel to each other and electrically insulated away from each other, said winding being constructed by winding said strip-like wire member a plurality of times with diametrically opposed portions of each turn being twisted and overturned upside down to have first and second winding portions having a cross section in which said rectangular wires are positioned in matrix, said first and second winding portions having the same arrangement of said wires in a cross section perpendicular to said rotational axis, said first winding portion being disposed in an outward region of one of said slots and said second winding portion being disposed in an inward region of another of said slots corresponding to said one of said slots, one of said windings and another of said windings disposed adjacent to said one winding being electrically connected to each other in a manner such that said wires in said one winding positioned in order from an upstream to a downstream with respect to a rotational direction of said rotor are connected to said wires in said another winding positioned in order from said downstream to said upstream with respect to said rotational direction, respectively.

In another aspect of the invention, a total cross section area of said wires to a total cross section area of said stator in a cross section perpendicular to said central axis is 55% or more.

According to the invention, an improved power conversion efficiency is attained in the superconducting rotating electrical machine with a superconducting rotor and normal-conducting stator.

BRIEF DESCRIPTION OF THE DRAWINGS

FIG. 6A is a partial cross section of the superconducting rotating electrical machine and FIG. 6B is a cross sectional view of the teeth and the windings;

FIG. 7 is a longitudinal cross sectional view of the superconducting rotating electrical machine in FIG. 1;

FIG. 9A is a diagram showing a generation of eddy current in a conductive material, FIG. 9B is a diagram showing that the moving magnetic field moves across the conductive member, and FIG. 9C is a diagram showing the eddy current generated in the cross section of the winding;

FIGS. 16A-16C are diagrams showing a pole-to-pole connection for the rotating electrical machine with 6 poles and 72 slots.

DETAILED DESCRIPTION OF THE PREFERRED EMBODIMENTS

Referring to the accompanying drawings, descriptions will be made to a superconducting rotating electrical machine and a stator incorporated in the rotating electrical machine, according to the embodiment of the invention.

Figure 1:
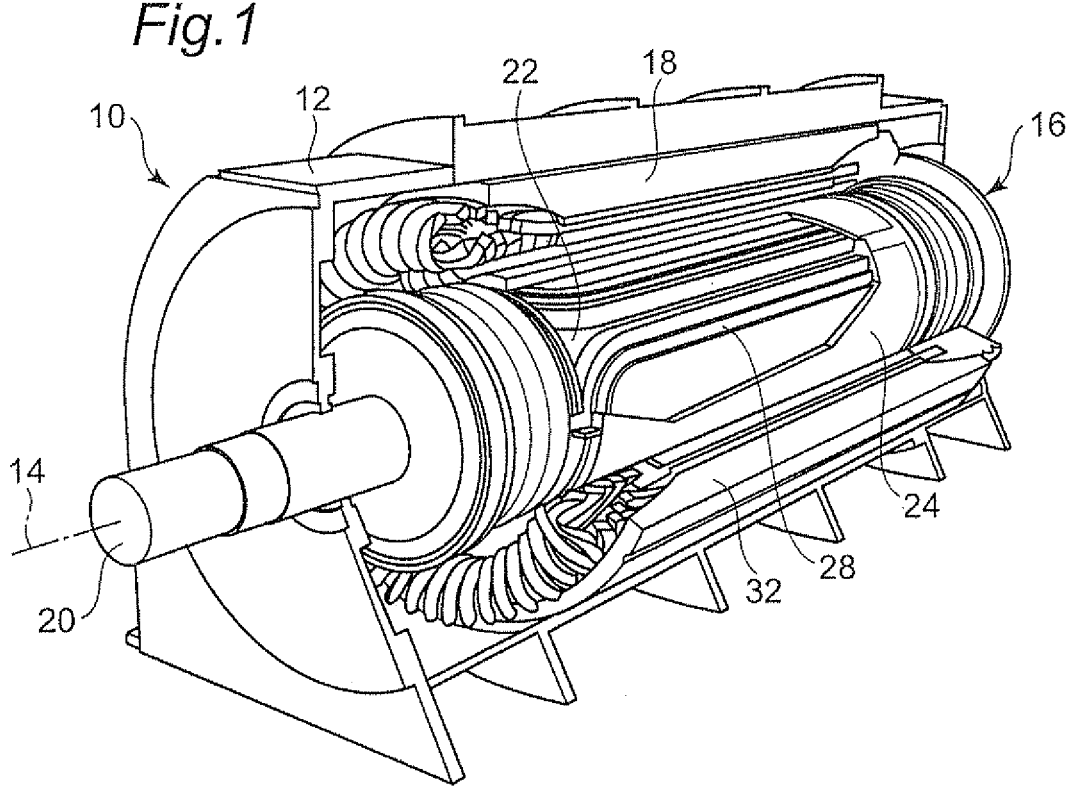
FIG. 1 is a partially broken—away perspective view of a superconducting rotating electrical machine.
Figure 2:
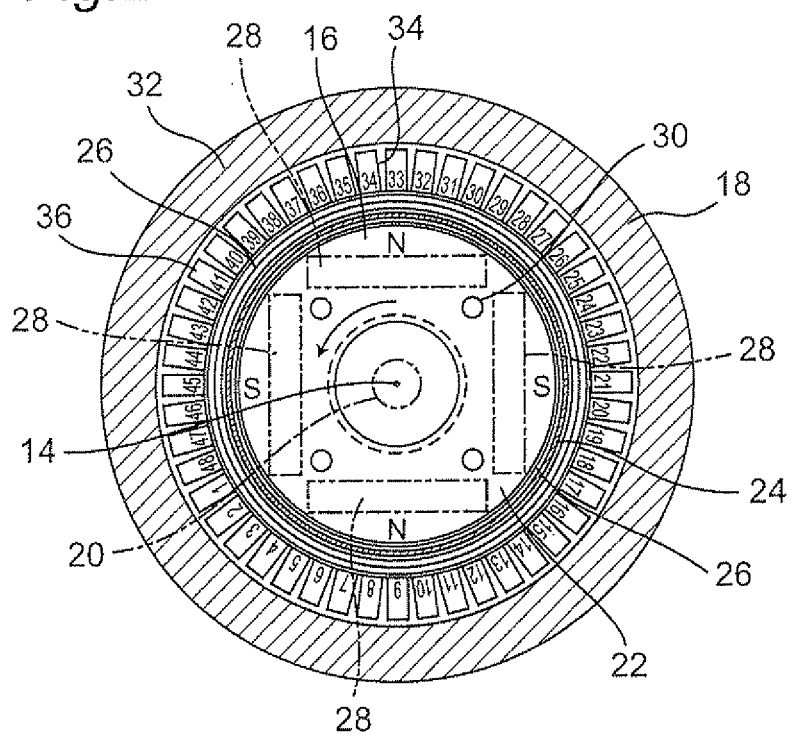
FIG. 2 is a transverse cross sectional view of the superconducting rotating electrical machine in FIG. 1.
Figure 3:
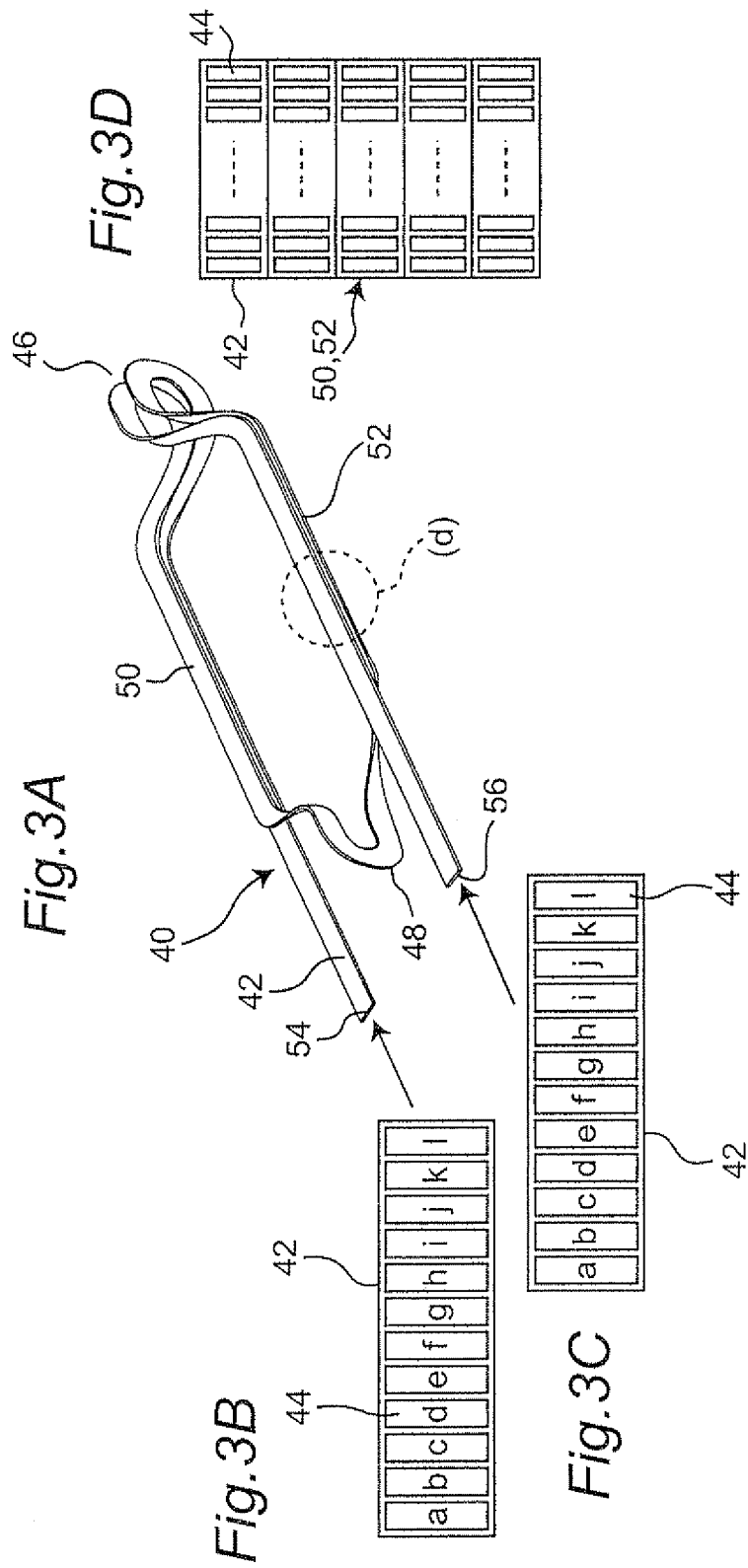
FIGS. 3A-3D are a perspective view, an end view, and a cross sectional view of the winding, respectively.

FIG. 1 shows external and internal structures of a radial-gap superconducting rotating electrical machine and FIG. 2 shows a cross section of the rotating electrical machine in FIG. 1. As shown in the drawings, the rotating electrical machine generally indicated by reference number has a housing 12, a rotor 16 supported for rotation about a central axis 14 defined by the housing 12, and a stator 18 mounted around the rotor 16 and secured on the inner surface wall of the housing 12.

The rotor 16 comprises a rotating shaft 20 extending along the central axis 14 and supported for rotation by the housing 12. The shaft 20 supports a core 22 made of an internal cylinder and a casing 24 made of an external cylinder, coaxially mounted about the central axis 14, to define a cylindrical, vacuum insulating cavity 26 between the core 22 and the casing 24. A plurality pairs of ironcoreless superconducting windings or coils 28 are mounted on the external surface of the core 22 at a regular interval in the peripheral direction. Although not shown, the coils 28 are electrically connected to a power source. As shown in FIG. 2, according to the embodiment four superconducting coils 28 are mounted at a regular interval in the peripheral direction, which allows that four magnetic poles are formed so that north poles N and south poles S appear alternately in the peripheral direction by the application of electric currents to the superconducting coils 28. The core 22 has a plurality of cooling medium conveying passages 30 defined therein to extend in parallel to the central axis 14. The passages 30 are fluidly connected to a cooling medium supply source not shown so that cooling medium such as helium gas is supplied into respective passages from the cooling medium supply source. Preferably, the core 22 is made by cutting a non-magnetic material with an improved low temperature property, such as a hollow cylindrical forging material of SUS316. Preferably, the casing 24 has one or more heat insulating layers with an improved low temperature insulating property.

The stator 18 has a cylindrical back yoke 18 securely mounted on the internal surface of the housing 12. Preferably, the back yoke 18 is made by laminating a number of magnetic steel sheets, such as silicon steel sheets, oriented in a direction orthogonal to the central axis 14. The back yoke 18 further supports a number of teeth 34 positioned on the internal surface of the back yoke at a regular interval in the peripheral direction about the central axis 14. Each of the teeth 34 extends radially inwardly from the back yoke 32 and parallel to the central axis 14. Each peripherally neighboring two teeth 34 defines a substantially rectangular cross section groove or slot 36 therebetween which extends in a direction parallel to the central axis 14, in which a part of an associated winding 40 described below (see FIGS. 3A-3D) is accommodated. In the embodiment, the rotating electric machine 10 comprises 48 teeth 34 and 48 slots 36. Each slot 36 has a rectangular cross section defined by a pair of radially extending long sides and a pair of peripherally extending short sides.

The teeth 34 are made of non-magnetic material. In the embodiment, the teeth 34 are formed of a rigid resin material having an elevated mechanical strength, such as fiber-reinforced plastic (FRP). The teeth 34 may be made of non-magnetic metal such as stainless. In either case, the teeth 34 may be formed by laminating a number of thin plates arranged in parallel to the central axis 14. Because the teeth 34 are made of non-magnetic material as described above, no eddy current would occur in the teeth 34 with the movement of the magnetic field caused by the rotation of the rotor 16, so that no mechanism is required for cooling the teeth 34. Also, no magnetic flux concentrates at the radially inward ends of the teeth 34 opposing the rotor 16.

Referring to FIGS. 3A-3D, the winding 40 is made by winding a wire member 42. The wire member 42 is in the form of strip and comprises a plurality of wires 44 arranged in parallel to each other. Each wire 44 is electrically insulated from the neighborhood wire or wires by an insulating material provided therebetween. In the embodiment, the wire 44 has a rectangular cross section defined by long sides oriented in the thicknesswise direction of the wire member 42 and short sides oriented in the widthwise direction of the wire member 42. For example, used for the wire 44 is a commercially available typical copper rectangular cross sectional material having 6 millimeter long sides and 2.83 millimeter short sides.

In the embodiment the wire member 42 comprises 12 wires 44(a)-44(l) arranged in parallel to each other and wound around five times to form the winding 40. In the embodiment the wire member 42 is wound around hexagonally to form diametrically opposed two twisted portions 46, 48 at each of which the wire member 42 is turned upside down. This results in that each stacked straight portions 50, 52 on opposite sides of the twisted portions 46, 48. Each cross section of the straight portions 50, 52 has a 5×12 wire matrix in which each row has 12 wires 44(a)-44(l) arranged in this order from left to right. In the following descriptions, the straight portion 50 adjacent to the proximal end 54 of the wire 44 is referred to as "proximal straight portion" and the straight portion 52 adjacent to the distal end 56 of the wire 44 is referred to as "distal straight portion".

Figure 4:
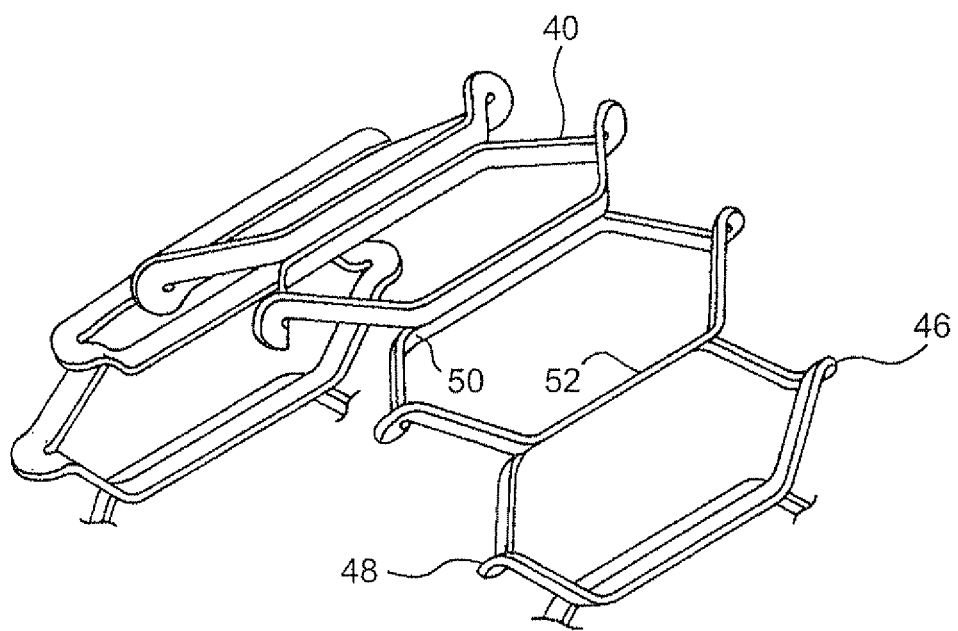
FIG. 4 is a perspective view of the winding.
Figure 5A:
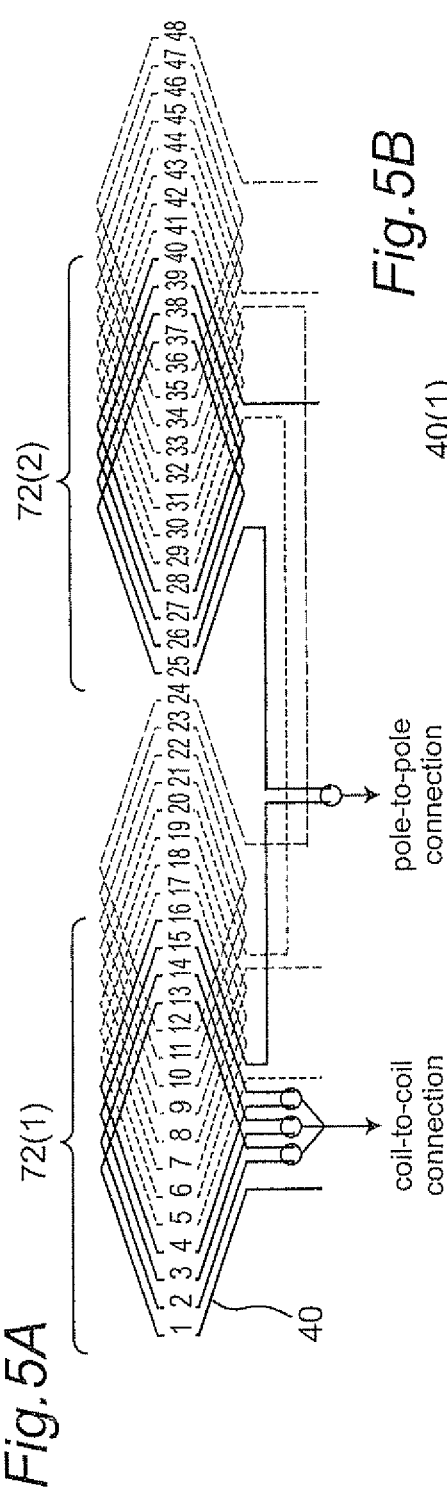
FIGS. 5A and 5B are diagrams showing an arrangement of the windings in each of which numerals 1-48 designate slot numbers.
Figure 5B:
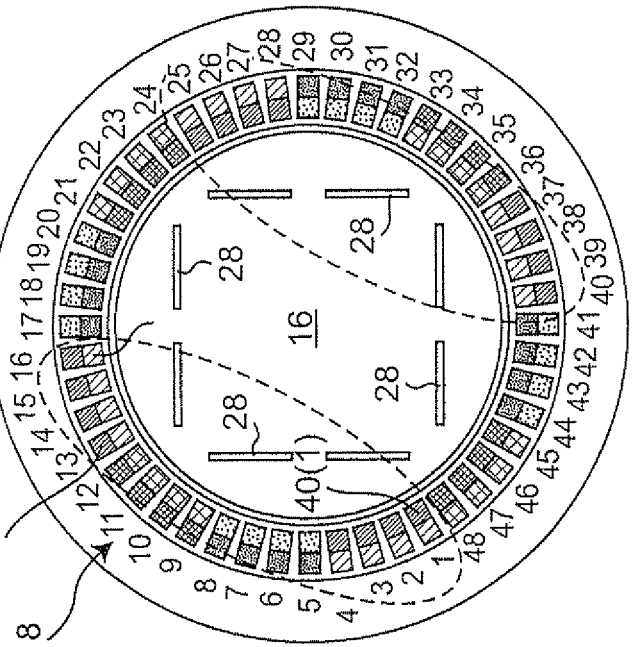

The number of the windings corresponds to the number of slots, namely, 48 windings 40(1)-40(48) are prepared in the embodiment with 48 slots. Each winding 40. Each winding 40 is mounted on the stator 18 so that the proximal straight portion 50 is positioned on radially inward region 60 of one slot 36(i) and the distal straight portions 52 is positioned on radially outward region 62 of another slot 36(i+12) which is the 12th slot counted peripherally from the one slot 36(i) (See FIG. 4). Specifically, as shown in FIGS. 5A, 5B, and 5C in which references 1-48 designate the slot number, the windings 40(1)-40(48) are positioned with the proximal straight portions 50 thereof fitted on the radially inward regions 60 of the slots 36(1)-36(48) and the distal straight portions 52 thereof positioned on the radially outward regions 62 of the slots 36(13)-36(12), which results in that 10×12 wire matrix is formed within the rectangular region 60 of each slot 36 (See FIGS. 6A and 6B). The twisted portions 46, 48 and the proximal and distal ends 54, 56 are positioned outside the longitudinal ends of the slots and the proximal end 54 of one winding is electrically connected with the associated distal end 56 of another winding, which will be described below (See FIG. 7).

The windings 40 so arranged are electrically connected in the conventional manner. The rotating electrical machine in this embodiment is a 3-phase rotating electrical machine with 4 magnetic poles, 6 coils, and 48 slots. Then, the windings 40(1)-40(48) are divided into 12 groups each having continuously neighboring four windings.

Figure 8A:
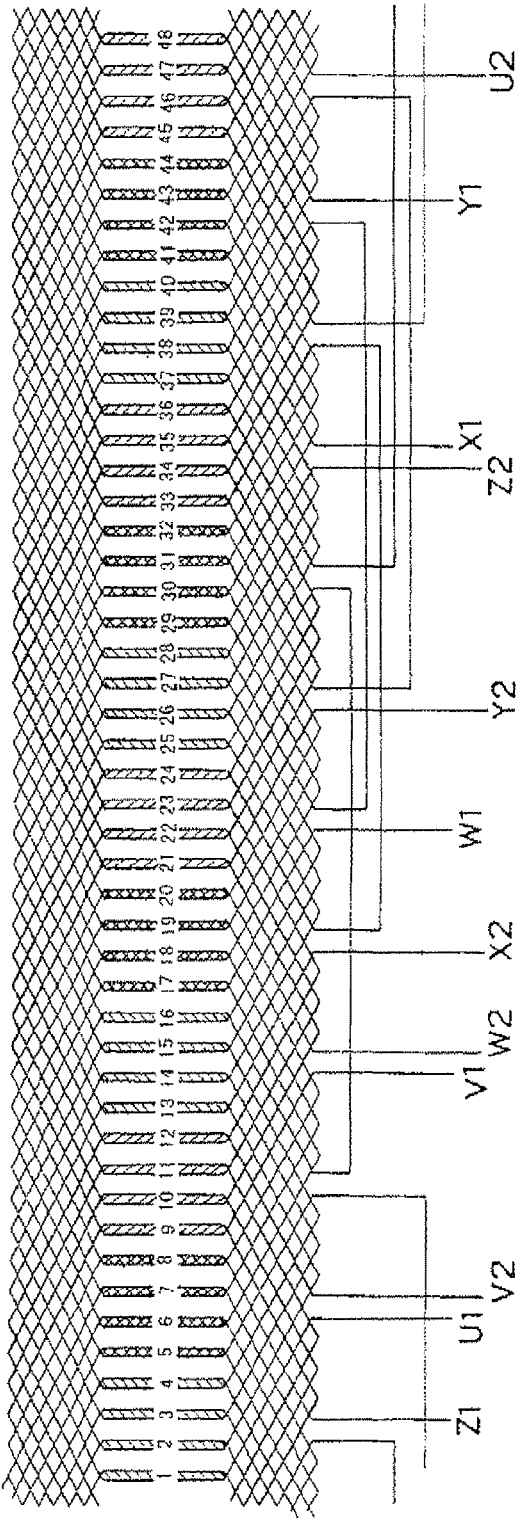
FIG. 8A is a diagram showing electric connections of the windings and FIGS. 8B and 8C are diagrams showing Y-connections of the superconducting rotating electrical machine, in each of which numerals 1-48 designate slot numbers.
Figure 8C:
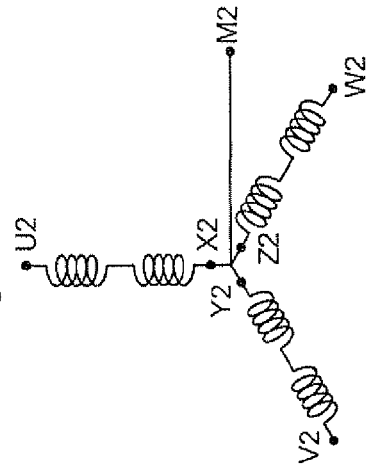
Figure 8B:
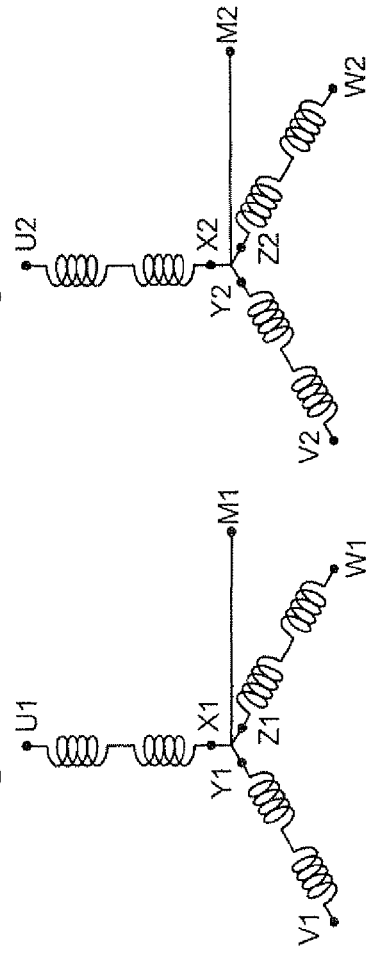

Specifically, as shown in FIGS. 8A, 8B, and 8C, the proximal end of the winding 40(1) is connected to a terminal U1. The distal end of the winding 40(1) and the proximal end of winding 40(2), the distal end of the winding 40(2) and the proximal end of winding 40(3), the distal end of the winding 40(3) and the proximal end of winding 40(4), the distal end of the winding 40(4) and the proximal end of winding 40(25) are connected to each other. Also, the distal end of the winding 40(25) and the proximal end of winding 40(26), the distal end of the winding 40(26) and the proximal end of winding 40(27), and the distal end of the winding 40(27) and the proximal end of winding 40(28) are connected to each other. The distal end of the winding 40(29) is connected to a terminal X1.

The distal end of the winding 40(5) and the proximal end of winding 40(6), the distal end of the winding 40(6) and the proximal end of winding 40(7), and the distal end of the winding 40(7) and the proximal end of winding 40(8) are connected to each other. The distal end of the winding 40(8) is connected to a terminal W2. The proximal end of the winding 40(29) is connected to a terminal Z2. The distal end of the winding 40(29) and the proximal end of winding 40(30), the distal end of the winding 40(30) and the proximal end of winding 40(31), the distal end of the winding 40(31) and the proximal end of winding 40(32), and the distal end of the winding 40(32) and the proximal end of the winding 40(5) are connected to each other.

The proximal end of the winding 40(9) is connected to a terminal V1. The distal end of the winding 40(9) and the proximal end of winding 40(10), the distal end of the winding 40(10) and the proximal end of winding 40(11), the distal end of the winding 40(11) and the proximal end of winding 40(12), the distal end of the winding 40(12) and the proximal end of winding 40(33) are connected to each other. Also, the distal end of the winding 40(33) and the proximal end of winding 40(34), the distal end of the winding 40(34) and the proximal end of winding 40(35), and the distal end of the winding 40(35) and the proximal end of winding 40(36) are connected to each other. The distal end of the winding 40(36) is connected to a terminal Y1.

The proximal end of the winding 40(13) is connected to a terminal X2. The distal end of the winding 40(13) and the proximal end of winding 40(14), the distal end of the winding 40(14) and the proximal end of winding 40(15), the distal end of the winding 40(15) and the proximal end of winding 40(16), the distal end of the winding 40(16) and the proximal end of winding 40(37) are connected to each other. Also, the distal end of the winding 40(37) and the proximal end of winding 40(38), the distal end of the winding 40(38) and the proximal end of winding 40(39), and the distal end of the winding 40(39) and the proximal end of winding 40(40) are connected to each other. The proximal end of the winding 40(40) is connected to a terminal U2.

The proximal end of the winding 40(17) is connected to a terminal W1. The distal end of the winding 40(17) and the proximal end of winding 40(18), the distal end of the winding 40(18) and the proximal end of winding 40(19), the distal end of the winding 40(19) and the proximal end of winding 40(20), the distal end of the winding 40(20) and the proximal end of winding 40(41) are connected to each other. Also, the distal end of the winding 40(41) and the proximal end of winding 40(42), the distal end of the winding 40(42) and the proximal end of winding 40(43), and the distal end of the winding 40(43) and the proximal end of winding 40(44) are connected to each other. The distal end of the winding 40(44) is connected to a terminal Z1.

The proximal end of the winding 40(21) is connected to a terminal Y2. The distal end of the winding 40(21) and the proximal end of winding 40(22), the distal end of the winding 40(22) and the proximal end of winding 40(23), the distal end of the winding 40(23) and the proximal end of winding 40(24), the distal end of the winding 40(24) and the proximal end of winding 40(45) are connected to each other. Also, the distal end of the winding 40(45) and the proximal end of winding 40(46), the distal end of the winding 40(46) and the proximal end of winding 40(47), and the distal end of the winding 40(47) and the proximal end of the winding 40(48) is connected to a terminal V2.

According to the rotating electrical machine 10 so constructed, an electric current is applied to the superconducting coil 28 from the power source not shown to form magnetic poles at a regular angle of 90 degrees in the circumferential direction so that N (north poles) and S (south poles) appear alternately. Also, an electric current is applied from the power source not shown to the windings 40 at predetermined timings so that, according to variations of the magnetic fields timed with the application of electric current, the rotor is rotated in the counterclockwise direction in FIG. 2.

During the rotation of the rotor 16, the magnetic fields generated by the superconducting coils 28 move in the clockwise direction (counterclockwise direction in FIG. 2). As shown in FIG. 9A, when the magnetic field 68 passes by the conductive member (wire, bundle of wires) 66, an eddy current 70 generates in the conductive member 66. If the tooth were made of magnetic material, the magnetic field would concentrate on the superconducting coil. The teeth 34 in the above-described rotating electrical machine 10, however, is made of non-magnetic material, which results in that, with the rotation of the rotor 16, the magnetic fluxes 68 formed by the superconducting coils 28 pass across the wires 44 in the slots to induce eddy currents in the wires 44. The intensity of the eddy currents in the wires 44 varies with time according to the movements of the magnetic fields, which results in a voltage difference between one and the other ends, e.g., upstream and downstream wires thereof with respect to the rotational direction of the rotor.

The eddy current flow direction depends on the polarity of the magnetic field to which the bundle of wires opposes. In the rotating electrical machine with 4 magnetic poles, 6 coils and 48 slots, when the proximal straight portions 50 of the windings 40(1)-40(4) oppose N magnetic pole of the superconducting coil 28, the distal straight portions 52 thereof oppose S magnetic pole of the coil 28. Then, as shown in FIG. 9C, in the proximal straight portion 50 opposing N magnetic pole, a higher voltage difference H(+) occurs with respect to the longitudinal axis direction of the machine, in each wire positioned on the upstream side with respect to the rotational direction of the rotor and a lower voltage difference L(+) occurs with respect to the longitudinal axis direction, in each wire positioned on the downstream side. This results in that, due to the difference between the upstream higher voltage difference H(+) and the downstream lower voltage difference L(+), the eddy current circulates between the upstream and downstream wire portions. On the other hand, in the distal straight portion 52 opposing S magnetic pole, a lower voltage difference L(−) occurs with respect to a direction opposite to the longitudinal axis direction, in each wire positioned on the upstream side with respect to the rotational direction of the rotor and a higher voltage difference H(−) occurs, with respect to the direction opposite to the longitudinal axis direction, in each wire positioned on the downstream side. This results in that, due to the differences between the upstream lower voltage difference L(−) and the downstream higher voltage difference H(−), the eddy current circulates between the upstream and downstream wire portions.

Figure 10A:
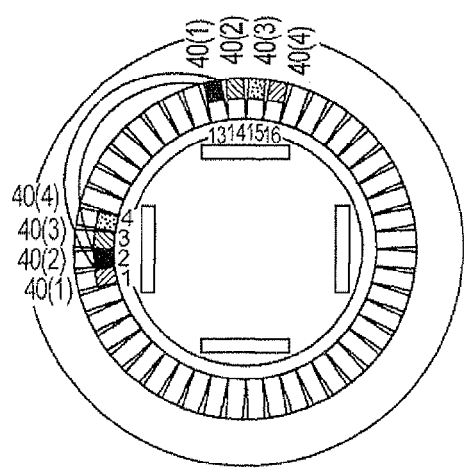
FIGS. 10A-10C are diagrams showing a coil-to-coil connection connection.
Figure 10B:
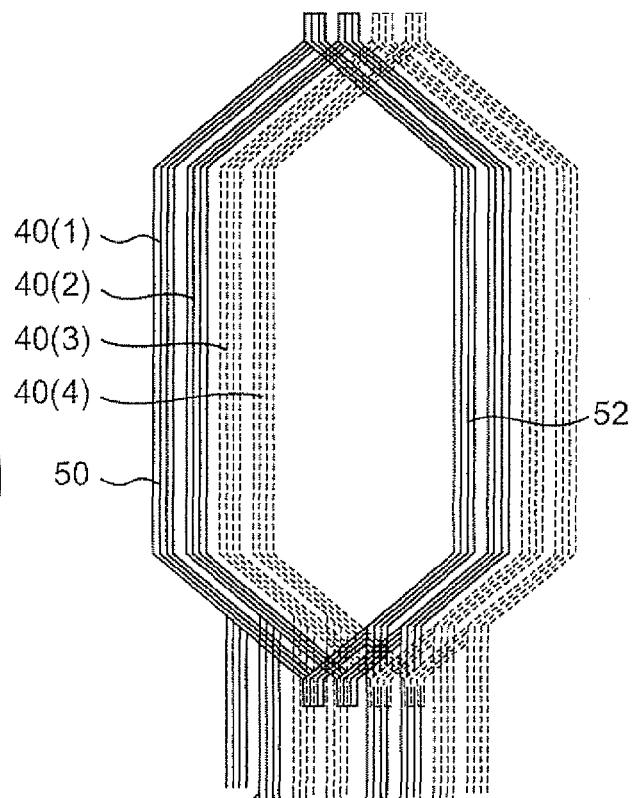
Figure 10C:
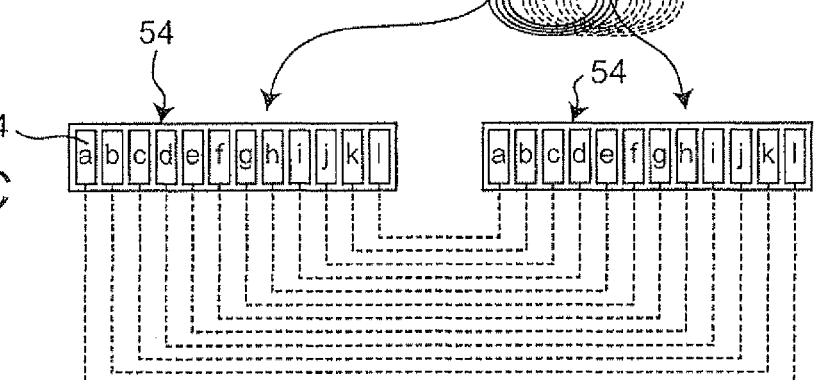

To address this problem, in the first embodiment shown in FIGS. 10A, 10B and 10C, each of the electrical connections between the neighborhood windings, e.g., windings 40(1) and 40(2), windings 40(2) and 40(3), and windings 40(3) and 40(4) (hereinafter referred to as "coil-to-coil connection"), is performed by connecting the distal ends 54 of wires 44(a)-44(l) with the neighborhood proximal ends 56 of wires 44(1)-

Figure 11:
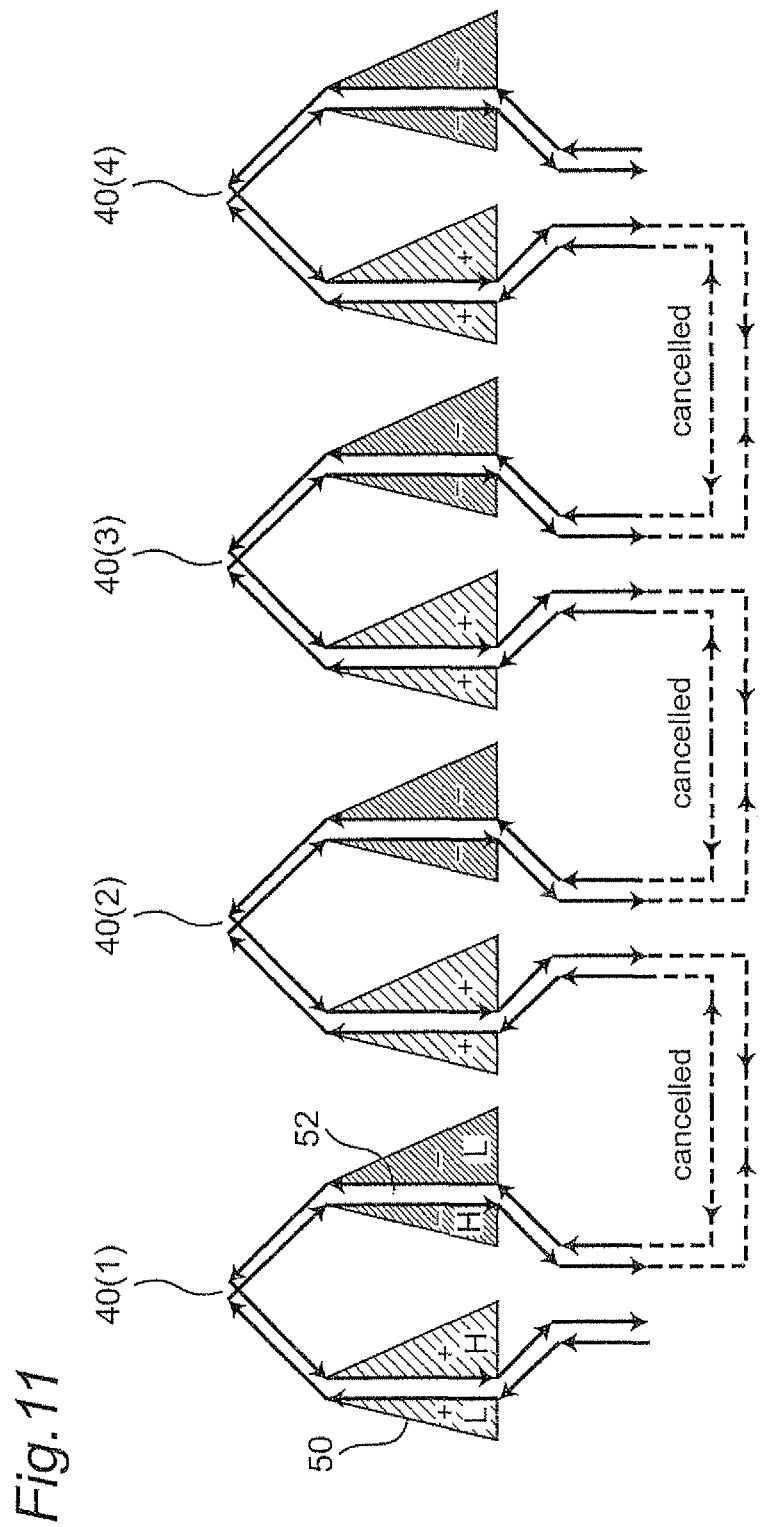
FIG. 11 is a diagram showing that the eddy currents are cancelled by the coil-to-coil connection according to the invention.

44(*a*), respectively, namely, wires 44(*a*) and 44(*l*), 44(*b*) and 44(*k*), ..., 44(*k*) and 44(*b*), and 44(*l*) and 44(*a*) are connected with each other. This results in that, as shown in FIG. 11, most of the eddy currents generated in the proximal straight portions 50 and the distal straight portions 52, flowing in the opposite directions in the winding are cancelled by each other. Then, the eddy current in the winding is minimized.

Figure 12A:
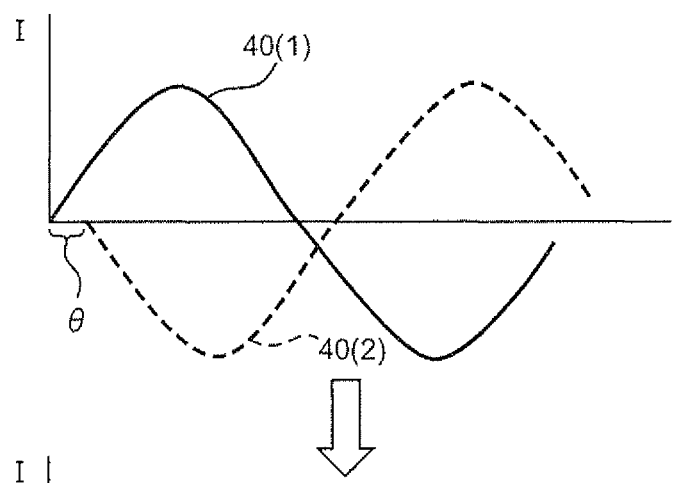
FIGS. 12A and 12B are diagrams showing a phase shift between the windings.
Figure 12B:
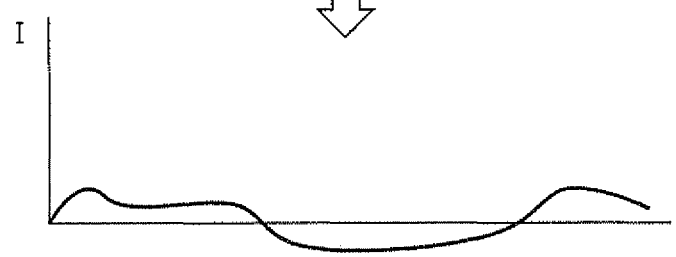

It should be noted that the windings are arranged at a regular interval in the peripheral direction and, therefore, as shown in FIGS. 12A and 12B, a certain phase difference exists between one eddy current in one winding and the other eddy current in the neighborhood winding, so that not all the eddy currents are cancelled by each other and a small amount of eddy current remains in each winding. To address this problem, in the second embodiment shown in FIGS. 13A, 13B and 13C, a connection between one winding group 72(1) including windings 40(1)-40(4) and arranged to oppose one magnetic pole and the other winding group 72(2) including windings 40(25)-40(28) and arranged to oppose the other magnetic pole, the first and second groups being spaced 180 degrees away from each other in the peripheral direction (herein after referred to as "pole-to-pole connection"), is performed by connecting the distal ends of the wires 44(*a*)-44(*l*) in the first group 72(1) with the proximal ends of the wires 44(*a*)-44(*l*) in the second group 72(2), respectively. This results in that, as shown in FIGS. 12A and 12B, the two groups take substantially the same voltage level and thereby the eddy currents are substantially cancelled by each other.

Figure 13A:
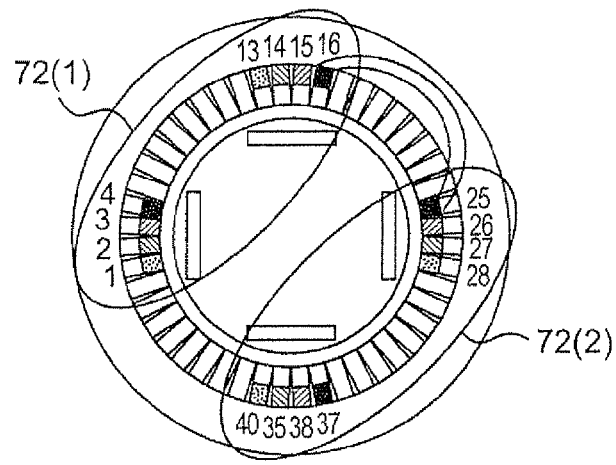
FIGS. 13A-13C are diagrams showing a pole-to-pole connection for the rotating electrical machine with 4 poles and 48 slots.
Figure 13B:
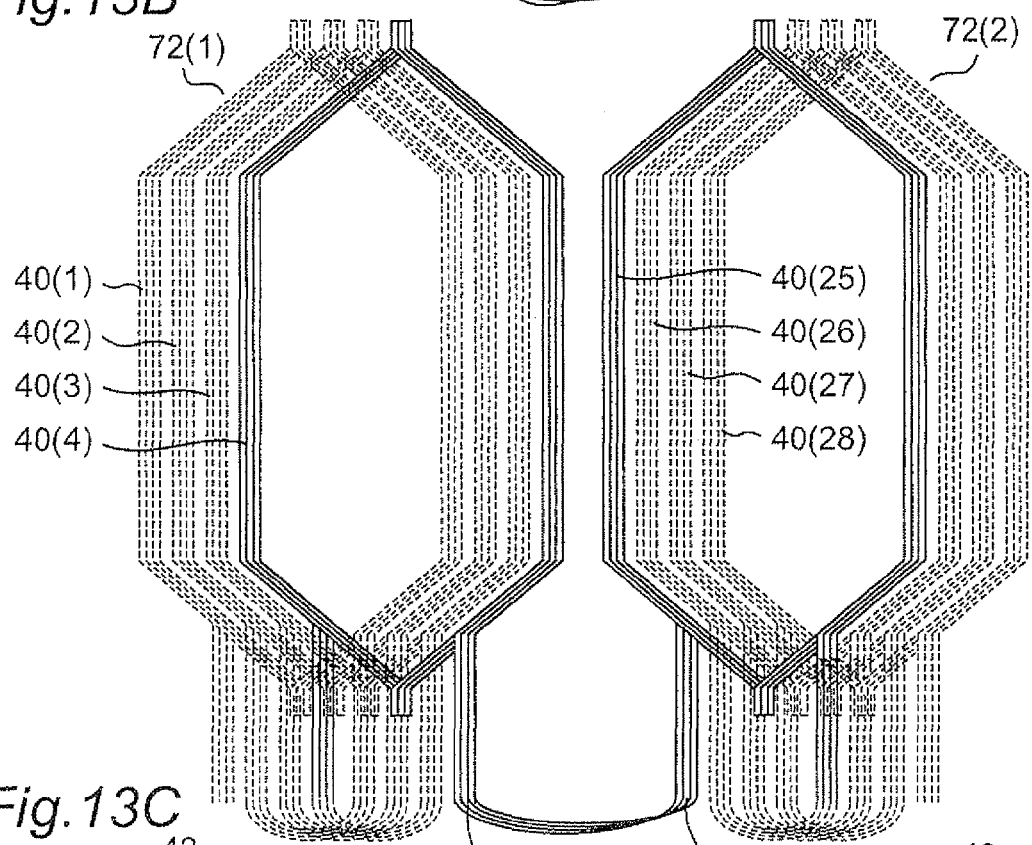
Figure 13C:
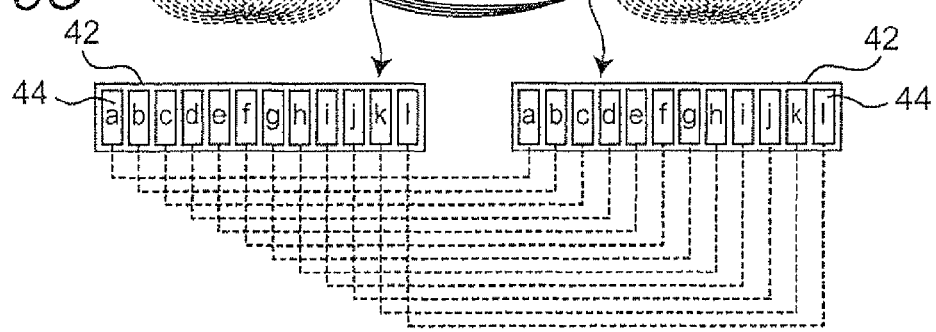

The pole-to-pole connection takes different forms depending upon wires to be connected and the number of slots. For example, as shown in FIGS. 13A, 13B, and 13C, if the rotating electrical machine has 3 phase, 4 magnetic poles, and 48 slots (i.e., 4 slots per one phase and one pole) and one group 72(1) with four windings 40(1)-40(4) and another group 72(2) with four windings 40(25)-40(28) are electrically connected by connecting between the distal end of winding 40(4) extended out of the outward region of the slot 36(16) and the proximal end of the winding 40(25) extended out of the inward region of the slot 36(25), they seem to be wound in the same direction when viewed from radially inwardly or radially outwardly. Also, each group comprises four windings. Then, in the pole-to-pole connection shown in the drawings, the wires 44(*a*)-44(*l*) of the winding 40(4) are connected to the wires 44(*a*)-44(*l*) of the winding 40(25), respectively, which results in that the two groups take substantially the same voltage level and thereby the eddy currents are substantially cancelled by each other.

Figure 14A:
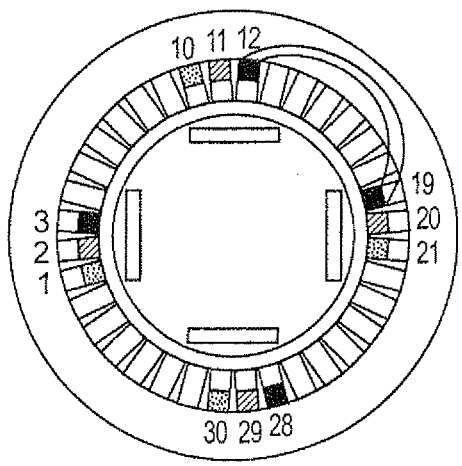
FIGS. 14A-14C are diagrams showing a pole-to-pole connection for the rotating electrical machine with 4 poles and 36 slots.
Figure 14B:
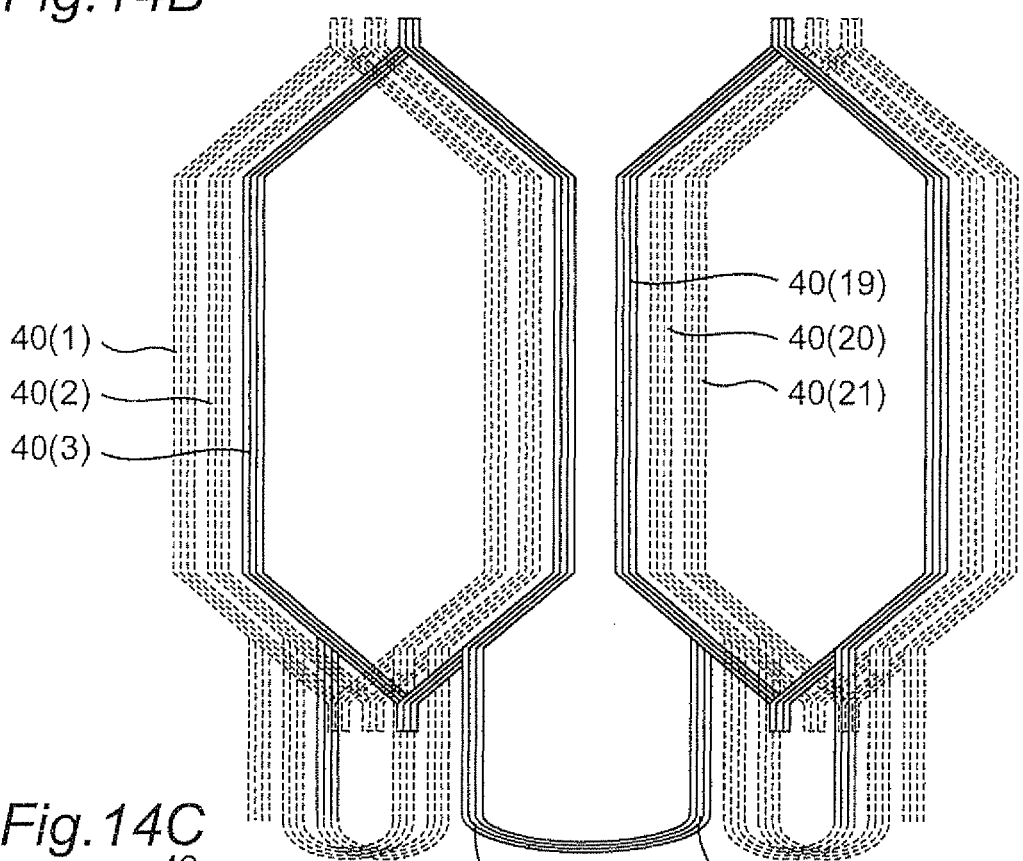
Figure 14C:
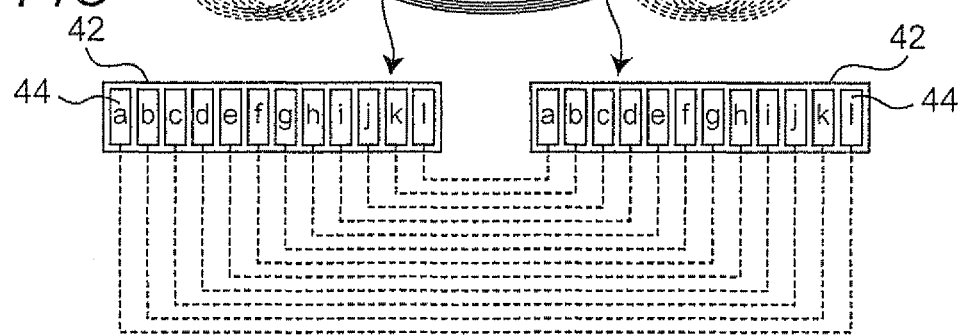

As shown in FIGS. 14A, 14B, and 14C, if the rotating electrical machine has 3 phase, 4 magnetic poles, and 36 slots (i.e., 3 slots per one phase and one pole) and one group with three windings 40(1)-40(3) and another group with three windings 40(19)-40(21) are electrically connected by connecting between the distal end of winding 40(3) extended out of the outward region of the slot 36(12) and the proximal end of the winding 40(19) extended out of the inward region of the slot 36(19), they seem to be wound in the same direction when viewed from radially inwardly or radially outwardly. Also, each group comprises three windings. Then, in the pole-to-pole connection shown in the drawings, the wires 44(*a*)-44(*l*) of the winding 40(3) are connected to the wires 44(*l*)-44(*a*) of the winding 40(19), respectively, which results in that the two groups take substantially the same voltage level and thereby the eddy currents are substantially cancelled by each other.

Figure 15A:
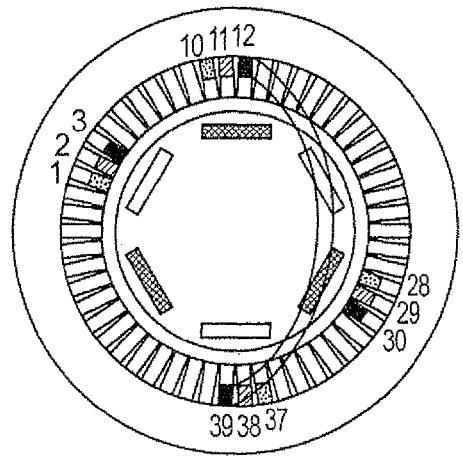
FIGS. 15A-15C are diagrams showing a pole-to-pole connection for the rotating electrical machine with 6 poles and 54 slots.
Figure 15B:
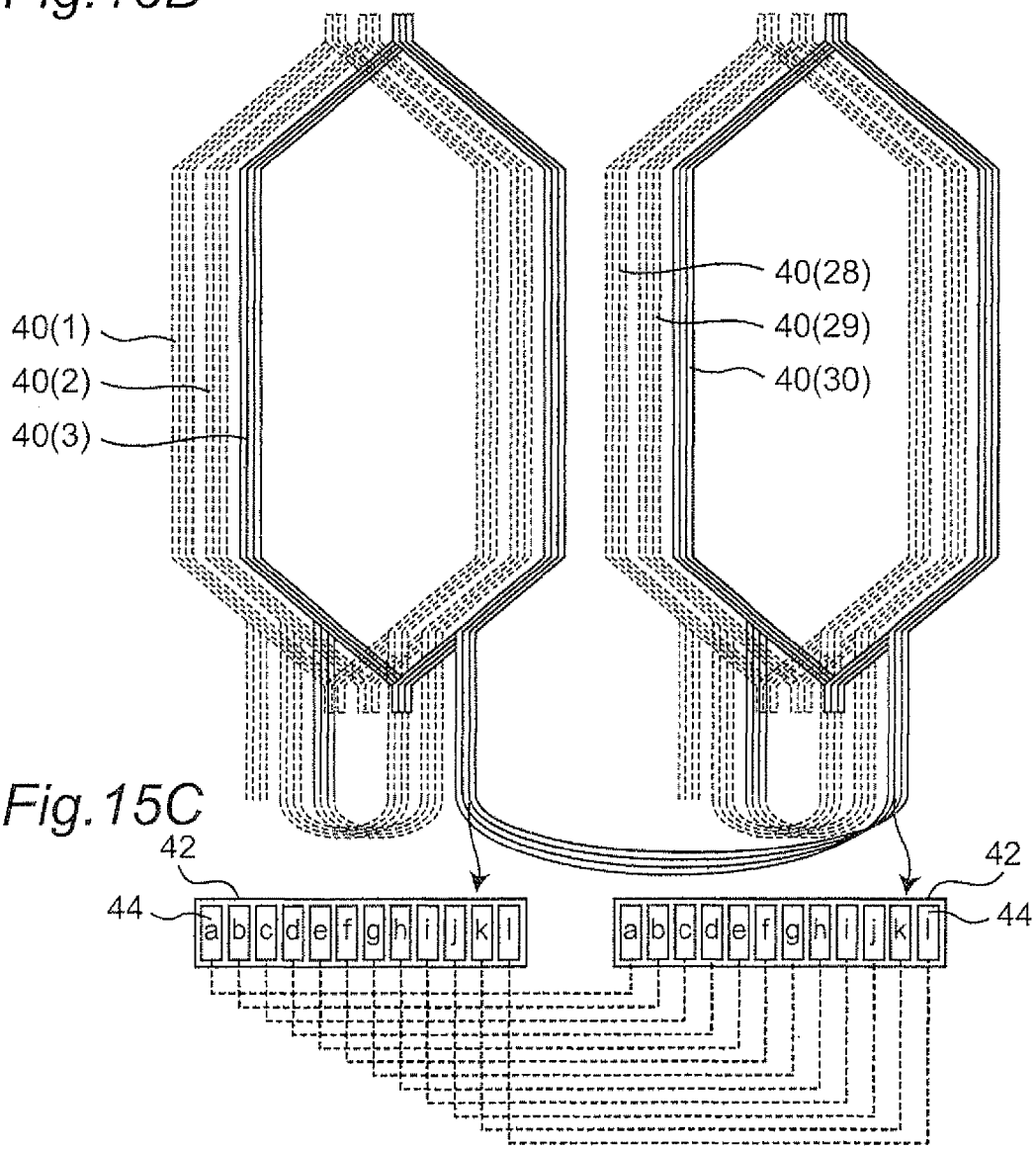
Figure 15C:
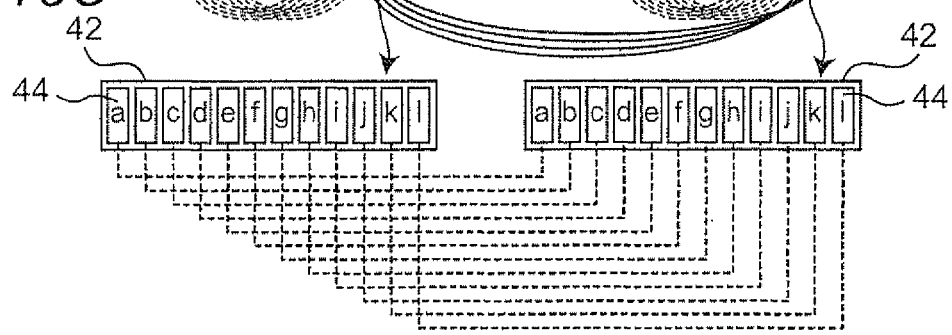

As shown in FIGS. 15A, 15B, and 15C, if the rotating electrical machine has 3 phase, 6 magnetic poles, and 54 slots (i.e., 3 slots per one phase and one pole) and one group with three windings 40(1)-40(3) and another group with three windings 40(28)-40(30) are electrically connected by connecting between the distal end of winding 40(3) extended out of the outward region of the slot 36(12) and the proximal end of the winding 40(30) extended out of the outward region of the slot 36(39), they seem to be wound in the opposite direction when viewed from radially inwardly or radially outwardly. Also, each group comprises three windings. Then, in the pole-to-pole connection shown in the drawings, the wires 44(*a*)-44(*l*) of the winding 40(3) are connected to the wires 44(*l*)-44(*a*) of the winding 40(30), respectively, which results in that the two groups take substantially the same voltage level and thereby the eddy currents are substantially cancelled by each other.

As shown in FIGS. 16A, 16B, and 16C, if the rotating electrical machine has 3 phase, 6 magnetic poles, and 72 slots (i.e., 4 slots per one phase and one pole) and one group with four windings 40(1)-40(4) and another group with four windings 40(37)-40(40) are electrically connected by connecting between the distal end of winding 40(4) extended out of the outward region of the slot 36(16) and the proximal end of the winding 40(40) extended out of the outward region of the slot 36(52), they seem to be wound in the opposite direction when viewed from radially inwardly or radially outwardly. Also, each group comprises four windings. Then, in the pole-to-pole connection shown in the drawings, the wires 44(*a*)-44(*l*) of the winding 40(4) are connected to the wires 44(*l*)-44(*a*) of the winding 40(40), respectively, which results in that the two groups take substantially the same voltage level and thereby the eddy currents are substantially cancelled by each other.

According to the embodiments of the rotating electrical machines, various advantages in addition to those described above can be achieved. Specifically, because a number of rectangular cross section wires are disposed in each slot in high density, the eddy current flowing in the mass of wires are broken into smaller parts, which minimizes the eddy current loss in each wire. Tests conducted by the inventors showed that it was preferably to accommodate more than 50 wires 40 in each slot 36 for the purpose of minimizing the eddy current generated in the wire.

The above described windings 40 can be handled more easily than the windings made of parallel rectangular or round wires or the windings made of twisted-wire bundles, so that the stator can be manufactured more economically.

Although the copper wires are used in the previous embodiments, wires made of silver, gold, or brass may be used instead provided that it has improved conductive property and flexiblity to the extent that it can be bent easily by hand in the winding operations.

in one embodiment, a total cross sectional area of teeth and slots in the stator 18 is 142,870 mm$^2$ and a total cross sectional area of the windings is 97,920 mm$^2$ (48 slots×60 mm×34 mm), so that a wire-area ratio of the superconducting rotating electrical machine is 68.54%. Then, even if a large amount of electric current flows in the rotating electrical machine, a temperature increase caused by the copper loss in the stator 18 is minimized. Tests conducted by the inventor showed that it was preferable to determine the wire-area ratio be 55% in order to minimize the copper loss.

Further tests were conducted to make sure how much power conversion efficiency of the 1 MW Class superconducting rotating electrical machine with the superconducting rotor and normal-conductive stator was improved. The test results showed only 0.5% loss in rotor and 1.5% loss in stator consisting of 0.75% copper loss and 0.75% eddy current loss, i.e., 2% loss in total, which showed that extremely high power conversion efficiency of 98% was attained. This result means that, the superconducting machine with the above-described stator can increase the power conversion efficiency even if the stator is normal-conductive, which in turn means that it is not necessary to employ a superconducting stator in the rotating electrical machine and therefore the machine can be constructed so economically.

As described above, according to the embodiments, the copper and eddy current losses in the windings of armature and the resultant heat generation are minimized, which is advantageous for the manufacturing the rotating electrical machine more economically.

The above-described embodiments are merely examples in nature and the scope of the invention is not limited by the embodiments. It should be noted that the present invention is determined by the claim or claims and should be construed to include various variations, modifications and equivalents thereof.

The invention claimed is:

1. A stator for use in a superconducting rotating electrical machine, the rotating electrical machine comprising a rotor with superconducting windings and said stator mounted around the rotor, comprising:
   a number of teeth disposed at a regular interval about a rotational axis of the rotor to define slots each between adjacent teeth; and
   a plurality of windings, each winding having a strip-like wire member, said wire member having a plurality of rectangular cross-section wires in which said rectangular wires are arranged in parallel to each other and electrically insulated away from each other, said winding being constructed by winding said strip-like wire member a plurality of times to have first and second winding portions having a cross section in which said rectangular wires are positioned in matrix, said first and second winding portions having the same arrangement of said wires in a cross section perpendicular to said rotational axis, said first winding portion being disposed in an outward region of one of said slots and said second winding portion being disposed in an inward region of another of said slots corresponding to said one of said slots.

2. A stator for use in a superconducting rotating electrical machine, the rotating electrical machine comprising a rotor with superconducting windings and said stator mounted around the rotor, comprising:
   a number of teeth disposed at a regular interval about a rotational axis of the rotor to define slots each between adjacent teeth; and
   a plurality of windings, each winding having a strip-like wire member, said wire member having a plurality of wires in which said wires are arranged in parallel to each other and electrically insulated away from each other, said winding being constructed by winding said strip-like wire member a plurality of times with diametrically opposed portions of each turn being twisted and overturned upside down to have first and second winding portions having a cross section in which said rectangular wires are positioned in matrix, said first and second winding portions having the same arrangement of said wires in a cross section perpendicular to said rotational axis, said first winding portion being disposed in an outward region of one of said slots and said second winding portion being disposed in an inward region of another of said slots corresponding to said one of said slots, one of said windings and another of said windings disposed adjacent to said one winding being electrically connected to each other in a manner such that said wires in said one winding positioned in order from an upstream to a downstream with respect to a rotational direction of said rotor are connected to said wires in said another winding positioned in order from said downstream to said upstream with respect to said rotational direction, respectively.

3. The stator of claim 2, wherein said stator has a plurality groups of windings corresponding to the number of poles in said rotor,
   wherein each of said groups has an even number of said windings, and one of said groups and another of said groups corresponding to said one group being electrically connected to each other in a manner such that
   a first end of said wire member extended out of said outward region in said one group is connected to a second end of said wire member extended out of said inward region in said another group and
   said wires in said first end positioned in order from said upstream to said downstream are connected to said wires in said second end positioned in order from said upstream to said downstream, respectively.

4. The stator of claim 2, wherein said stator has a plurality groups of windings corresponding to the number of poles in said rotor,
   wherein each of said groups has an odd number of said windings, and one of said groups and another of said groups corresponding to said one group being electrically connected to each other in a manner such that
   a first end of said wire member extended out of said outward region in said one group is connected to a second end of said wire member extended out of said inward region in said another group and
   said wires in said first end positioned in order from said upstream to said downstream are connected to said wires in said second end positioned in order from said downstream to said upstream, respectively.

5. The stator of claim 2, wherein said stator has a plurality groups of windings corresponding to the number of poles in said rotor,
   wherein each of said groups has an even number of said windings, and one of said groups and another of said groups corresponding to said one group being electrically connected to each other in a manner such that
   a first end of said wire member extended out of said outward region in said one group is connected to a second end of said wire member extended out of said inward region in said another group and
   said wires in said first end positioned in order from said upstream to said downstream are connected to said wires in said second end positioned in order from said upstream to said downstream, respectively.

6. The stator of claim 2, wherein said stator has a plurality groups of windings corresponding to the number of poles in said rotor,
   wherein each of said groups has an odd number of said windings, and one of said groups and another of said groups corresponding to said one group being electrically connected to each other in a manner such that
   a first end of said wire member extended out of said outward region in said one group is connected to a second end of said wire member extended out of said inward region in said another group and
   said wires in said first end positioned in order from said upstream to said downstream are connected to said wires in said second end positioned in order from said upstream to said downstream, respectively.

7. The stator of claim 2, wherein each of said wires has a rectangular cross section defined by long sides and short sides and is disposed with said long and short sides oriented in a radial and a peripheral directions, respectively.

8. The stator of claim 1, wherein each of said slots has substantially a rectangular cross section defined by a pair of first sides extending in a radial direction and a pair of second sides extending in a peripheral direction, and each of said wires has a rectangular cross section defined by one sides and the other sides, said wire being oriented in said slot with said one sides and said the other sides oriented in said first and second sides, respectively.

9. The stator of claim 1, wherein each of said cross sections of said first and second winding portions has 50 or more wire cross sections.

10. The stator of claim 1, wherein said teeth is made of non-magnetic material.

11. The stator of claim 1, wherein a total cross section area of said wires to a total cross section area of said stator in a cross section perpendicular to said central axis is 55% or more.

12. A superconducting rotating electrical machine comprising a stator defined in claim 1.

* * * * *